May 12, 1925.  1,537,543

O. G. MAYER

SCALDING TANK CONVEYER

Filed Aug. 6, 1923

INVENTOR
Oscar G. Mayer
BY
Henry Blech
ATTORNEY.

Patented May 12, 1925.

1,537,543

UNITED STATES PATENT OFFICE.

OSCAR G. MAYER, OF CHICAGO, ILLINOIS.

SCALDING-TANK CONVEYER.

Application filed August 6, 1923. Serial No. 656,033.

*To all whom it may concern:*

Be it known that I, OSCAR G. MAYER, a citizen of the United States, residing at Chicago, in the county of Cook and State of Illinois, have invented new and useful Improvements in Scalding-Tank Conveyers, of which the following is a specification.

The invention relates to scalding tanks and more particularly to means for conveying carcasses in the tanks and from the receiving to the discharge end.

It is an object of the invention to provide efficient and positively acting means for conveying carcasses in the scalding vat so that uniform scalding of each carcass for the proper length of time is ensured.

A further object aims at providing means for conveying the carcasses in the tank by a combined forward and downward movement causing thereby a dipping of the carcasses and uniform scalding thereof.

It is another object of the invention to provide a plurality of racks actuated by cranks of shafts and engaging with their teeth the floating carcasses whereby the latter are simultaneously advanced and dipped.

A still further object consists in providing means for rendering the conveying means ineffective in case clogging of the scraping machine occurs to which the scalded carcasses are delivered.

It is also an object of the invention to provide certain features of construction and arrangement tending to improve a device of this particular character and to render the same highly efficient and reliable.

With these and other equally important objects in view, which will appear from the following description of the invention, the latter comprises the means described in the specification, particularly pointed out in the claims forming a part thereof, and illustrated in the accompanying drawing, in which—

Figure 1:
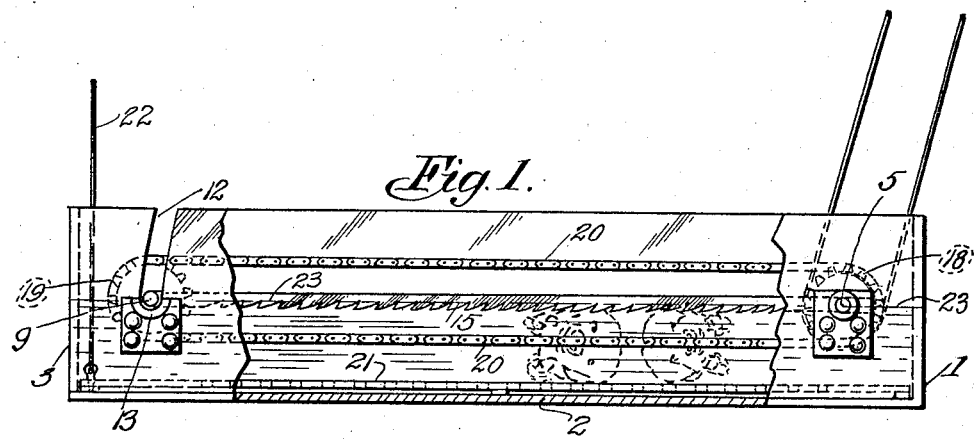
Fig. 1, is a diagrammatic side view of a tank to which my invention is applied, a portion of the tank being broken away to disclose interior construction.
Figure 2:
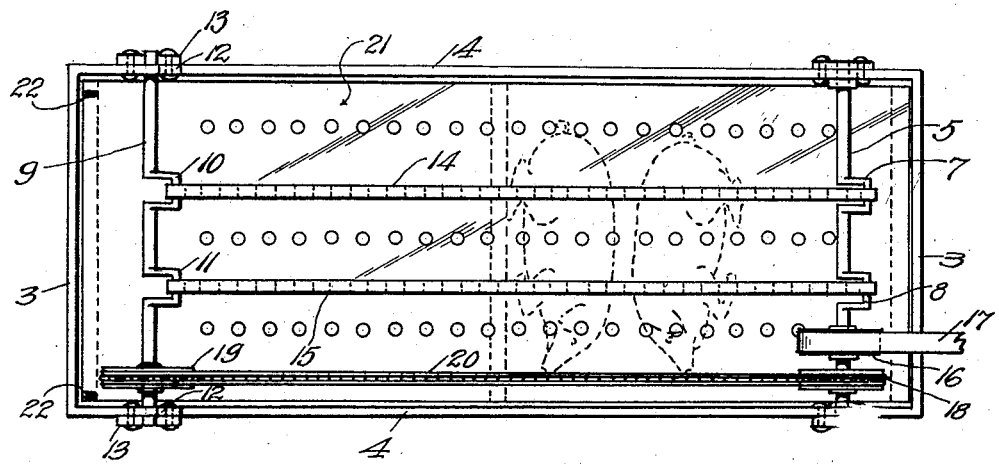
Fig. 2, is a top plan view of the tank.

Referring to the drawing, 1 generally designates a vat or tank which comprises the bottom 2, the end walls 3 and the side walls 4. A shaft transversely extends through the vat and is journaled in bearings 6 provided therefor.

The shaft 5 is provided with a pair of cranks 7 and 8, but if preferred the number of cranks may be increased or decreased as may be found expedient or useful.

A shaft 9 equipped with cranks 10 and 11 in registry with the aforementioned cranks, transversely extends through the vat but at a distance from shaft 5. The side walls of the vat are provided with curved slots 12, the radii of curvature of said slots being equal to the distance of the shaft 5 and 9. The slots originate at the top of the side walls and extend far enough to maintain the shaft 9 in horizontal alignment with shaft 5. Open bearings 13 are provided for shaft 9.

The registering cranks 7, 10, and 8, 11 are connected by links 14 and 15 respectively whose lower sides are formed as racks. A pulley 16 is fast on the shaft 5 and power is transmitted thereto by a belt 17 from any suitable source of power. A sprocket wheel 18 is also fast on the shaft 5 in registry with a sprocket wheel 19 keyed to the shaft 9. A chain belt 20 is trained around the wheels 18, 19, so that rotation of the shaft 5 is transmitted to the shaft 9.

On the bottom of the vat a perforated plate 21 is provided which has secured thereto, a rope 22 or other lifting means. The operation of the device is as follows:

Upon the delivery of carcasses such as hogs to the right end (as viewed in Fig. 1) and actuation of the shaft 5, in clockwise direction, the racks 14 and 15 are moved in a closed path but always in horizontal position. Thus the teeth of the racks will in the course of movement engage the floating hog carcasses and impart to them simultaneously a depressing and advancing movement toward the discharge end of the vat. Thereby the carcasses are not only advanced but also dipped, ensuring thereby a uniform scalding of the carcasses during their travel in the tank. Hot water is always maintained in the tank to a level indicated at 23. From the discharge end of the tank, the carcasses are conveyed to a scraping machine (not shown). If the latter does not function properly and conveying of carcasses is to be interrupted, then the plate 21 is raised by the ropes 22, and in this raising movement the shaft 9 is raised out of the tank through the slots 12, rendering the operation of the racks idle.

The drawing illustrates the invention more or less diagrammatically. Various changes and modification may be resorted to without departing from the principle of the invention. I, therefore, do not limit myself to the details of construction and arrangement as shown, but include all changes constituting departures within the scope and spirit of the invention as defined in the appended claims.

I claim:

1. In an apparatus of the kind specified, a vat, a plurality of crank shafts transversely arranged in said vat, a rack connecting the cranks of said shafts, and means for removing one of said shafts from the vat to render said rack idle.

2. In an apparatus of the kind specified, a vat, a plurality of crank shafts transversely arranged in said vat, a rack connecting the cranks of said shafts, one of said shafts bearing on the ends of slots provided in the vats, and means for removing said last named shaft from the vat without varying the distance between said shafts.

3. In an apparatus of the kind specified, a vat, a plurality of crank shafts transversely arranged in said vat, a rack connecting the cranks of said shafts, means for operatively connecting said shafts, and means for bodily removing one of said shafts but leaving the operative connections with the other shaft intact.

In witness whereof I affix my signature.

OSCAR G. MAYER.